United States Patent [19]

Rosenberg

[11] 4,166,319

[45] Sep. 4, 1979

[54] ILLUMINATED ENGRAVING MACHINE

[75] Inventor: Edward D. Rosenberg, Levittown, N.Y.

[73] Assignee: New Hermes, Incorporated, New York, N.Y.

[21] Appl. No.: 857,328

[22] Filed: Dec. 5, 1977

[51] Int. Cl.[2] ........................ B43L 13/10; B23Q 35/04

[52] U.S. Cl. .................................... 33/24 B; 33/18 R; 33/25 D; 72/7; 72/115; 72/412; 409/92; 409/126

[58] Field of Search ...................... 90/62 R, 13.1, 13.2, 90/13.3, 13.6, 13.9; 33/18 R, 18 B, 21 R, 22, 23 R, 23 H, 23 K, 24 R, 24 B, 25 R, 25 D; 362/32; 350/96.24

[56] References Cited

U.S. PATENT DOCUMENTS

| | | | |
|---|---|---|---|
| 3,614,414 | 10/1971 | Gores | 362/32 |
| 3,718,072 | 2/1973 | Berlant | 33/24 B |
| 3,758,951 | 9/1973 | Scrivo et al. | 362/32 |

*Primary Examiner*—Charles E. Phillips
*Assistant Examiner*—John W. Shepperd
*Attorney, Agent, or Firm*—Seidel, Gonda, Goldhammer & Panitch

[57] ABSTRACT

Engraving apparatus for engraving the inner periphery of a circular object such as a ring or band is provided with a tool holder which supports the engraving tool. A fiber optic bundle is supported by the tool holder and has one end exposed adjacent the engraving tool. A source of illumination communicates with the other end of the fiber optic bundle.

9 Claims, 6 Drawing Figures

ILLUMINATED ENGRAVING MACHINE

RELATED CASE

The subject matter of this application is an improvement over the co-pending application entitled "An Engraving Machine For Rings And Bangle Bracelets" filed on June 6, 1977 by Jack W. Levine et al., Ser. No. 803,508.

BACKGROUND

Engraving machines of the general type involved herein are known. For example, see U.S. Pat. No. 2,562,269. When engraving the inside of a ring with apparatus as per said patent or pending application, it is normally necessary to provide greater illumination than that which is available with ambient light. Before engraving, the engraver must determine where to start engraving, must have sufficient light to be certain that the engraving will be centralized, etc. Additionally, the engraver will halt operation several times in order to verify the work. Great care is important particularly if the ring being engraved is expensive.

It has been heretofore very difficult to illuminate the inner surface of the circular object such as ring or band to be engraved. Lamps are used which are both bulky and hot as well as being uncomfortable and inconvenient for the engraver. Another major objection to the use of such lamps is that the engraving tool and its support cast shadows on the area to be engraved. The present invention provides a unique solution to that problem.

SUMMARY OF THE INVENTION

The engraving apparatus of the present invention includes a frame which supports a tool holder. The tool holder supports an engraving tool for engraving the inner periphery of a circular object such as ring or band. Illumination of the area on the inner periphery of the circular object is attained by a fiber optic bundle. The fiber optic bundle is supported by the tool holder and has one end exposed adjacent the engraving tool. A source of illumination communicates with the other end of said fiber optic bundle.

It is an object of the present invention to provide a novel means for illuminating the engraving area on the inner periphery of a circular object such as a ring or band in a manner which is simple, inexpensive and reliable while being free from the objections of the prior art.

Other objects will appear hereinafter.

For the purpose of illustrating the invention, there is shown in the drawings form which is presently preferred; it being understood, however, that this invention is not limited to the precise arrangements and instrumentalities shown.

Figure 1:
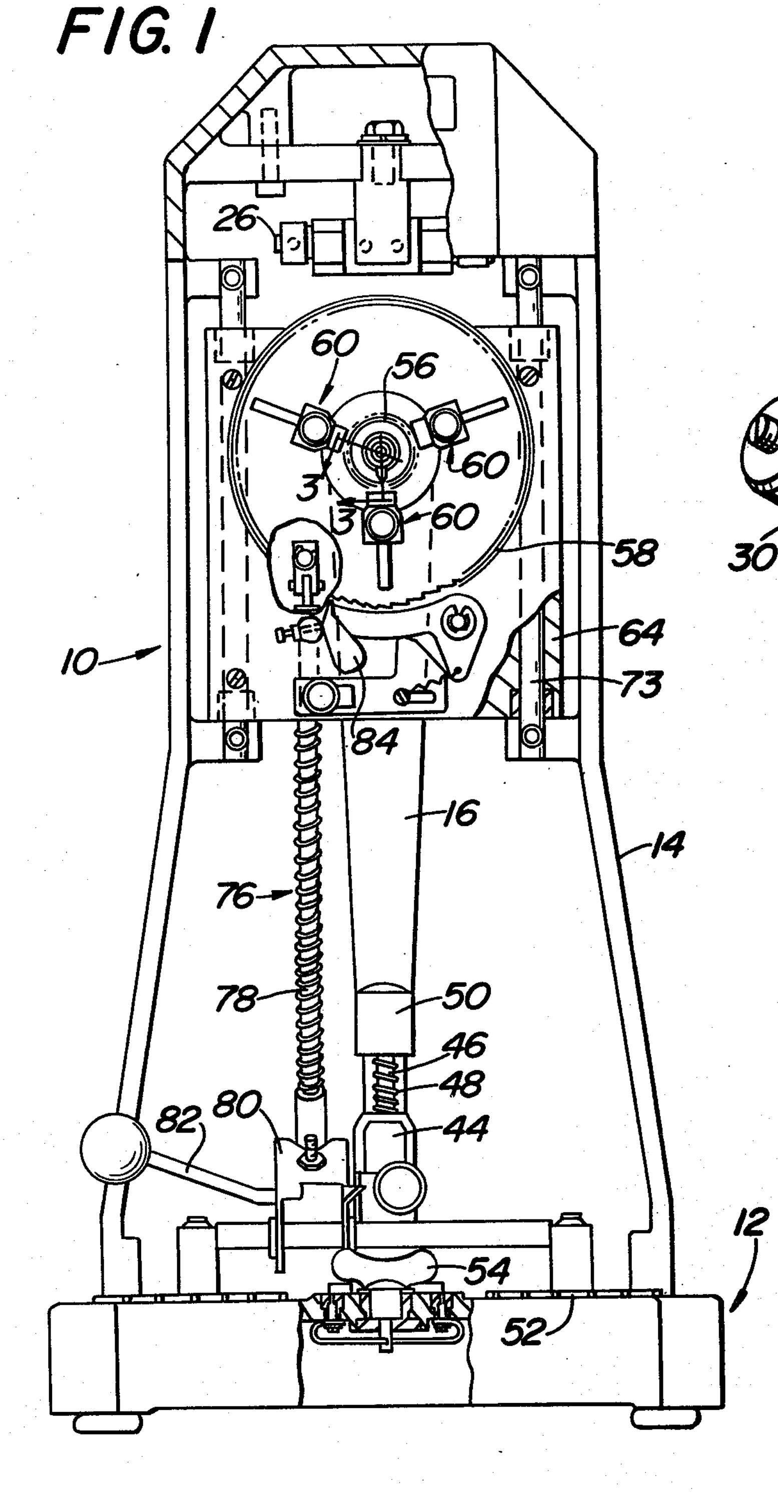
FIG. 1 is a front elevation view of engraving apparatus incorporating the present invention, with portions broken away for purposes of illustration.
Figure 2:
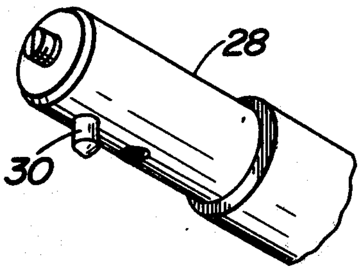
FIG. 2 is a perspective view of the tool holder and the tool supported thereby.
Figure 4:
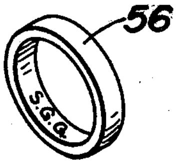
FIG. 4 is a perspective view of a ring which has been engraved.

Referring to the drawings in detail, wherein like numerals indicate like elements, there is shown engraving apparatus incorporating the present invention and designated generally as 10. The apparatus 10 includes a base 12 to which is connected an upright frame 14.

A stylus lever 16 is pivotably mounted to the upper end portion of the frame 14 so that it may have universal motion in two perpendicular planes in the manner as disclosed in the abovementioned pending application. Thus, the upper end of the stylus lever may pivot about the longitudinal axis of shaft 26 and may also rotate about an axis perpendicular to shaft 26. A tool holder 28 is connected to the lever 16 intermediate the ends of lever 16. Holder 28 supports an engraving tool such as a diamond cutting tool 30.

Figure 3:
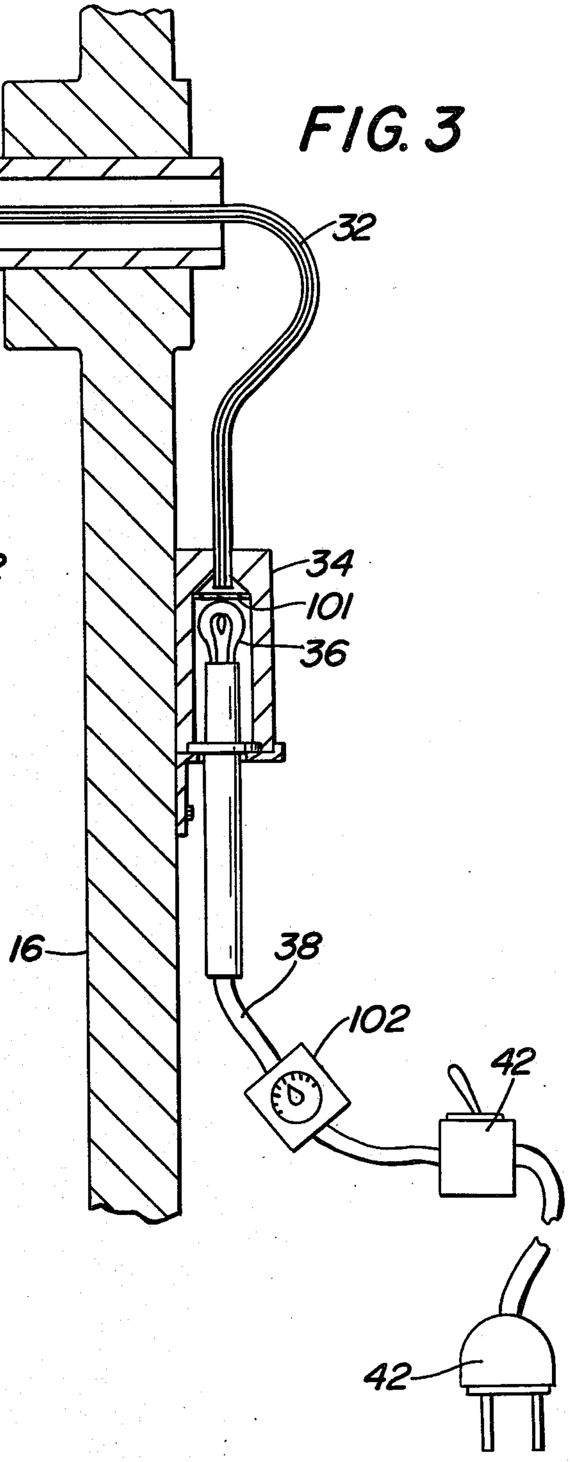
FIG. 3 is an enlarged sectional view taken along the line 3—3 in FIG. 1.

Referring to FIG. 3, holder 28 is hollow and has a hole drilled therethrough at approximately a 45° angle adjacent the cutting tool 30. One end of a fiber optic bundle 32 is exposed at said hole adjacent to the cutting tool 30. The fiber optic bundle 32 extends through the tool holder 28 and downwardly to a lamp housing 34. The other end of bundle 32 is exposed to a source of illumination 36 such as a lamp in said lamp housing 34. Adhesive or some other similar material is used to anchor the ends of the bundle 32 to the tool holder 28 and housing 34.

Bundle 32 is sometimes referred to as a light guide and may be of the type sold commercially by DuPont under the trademark CROFON. Bundle 32 is preferably a group of 10 mil diameter plastic fibers such as polymethyl methacrylate each in an optical insulating sheath having a reflective inner surface. A common jacket made of a material such as polyethylene surrounds the sheathed fibers. Hence, bundle 32 will receive illumination at the end within housing 34 and will transmit the illumination for discharge at its other end adjacent to the tool 30.

The source of illumination 36 is preferably of low voltage such as 2 or 3 volts. The source of illumination 36 is powered through a low voltage conductor 38 having an on/off switch 40 and is adapted to be connected to a source of potential by way of a combination transformer and plug 42. Since the housing 34 is supported by a bracket on the lever 16 for movement therewith, the conductor 38 is of sufficient length so as not to interfere with such movement.

The inner surface of rings and bracelets varies considerably in surface finish and texture. Some are "matte" finish, while others may be highly polished. Illuminating a highly polished surface produces some glare that may interfere with proper vision. This is overcome by two separate means used singularly or in combination. Referring to FIG. 3, the lamp housing 34 has an optical filter 101 cemented in place between the fiber optic bundle 32 and the lamp 36. This optical filter, which might be of the "polarizing" type, serves to significantly reduce the glare. Another means to reduce the amount of illumination is a variable potentiometer, variable thyristor, or other such device 102 in series with lamp 36.

A stylus housing 44 is secured to the lower end of the lever 16. A stylus carrier rod 46 is movably carried by the housing 44 and has a stylus attached to its lower end. The rod 46 is spring biased upwardly by spring 48 and has a knob 50 attached to its upper end. A circular pattern carrier 52 is rotatably secured to the base 12 by means of a clamp 54. The carrier 52 has a plurality of characters arranged in a circle around the perimeter of its face. The stylus will trace desired characters from the pattern carrier 52 and such character will be simultaneously engraved on a workpiece such as ring 56 by the engraving tool 30.

The frame 14 supports a movable work holder assembly including a ratchet wheel 58 having a central hole through which the tool holder 28 extends. The ratchet wheel 58 is rotatable in discrete increments to a plurality of indexed positions.

The workpiece such as ring 56 is held in a position concentric with the axis of the ratchet wheel 58 by means of a plurality of clamping chucks 60 each having a slideable jaw 62. The jaws 62 have a V-groove for receiving a portion of the periphery of the ring 56.

The entire work holder assembly is mounted to a vertically adjustable assembly 64. Assembly 64 includes a slide plate with a pair of guide columns through which rods 73 extend.

An indexing and locking mechanism 76 is provided to index the ratchet wheel 58 while at the same time locking the pattern carrier 52 in position on base 12. The mechanism 76 includes a connecting rod 78 attached at its upper end to the work holder assembly and at its lower end to a bracket 80 in such manner that downward movement of the lever arm 82 will cause upward movement of the rod 78. In a conventional manner, downward movement of lever arm 80 will also cause rotation of the indexing pawl 84. A retaining pawl 88 is secured to the assembly 64.

In a conventional manner, characters such as the letters "S.G.G." are engraved on the inner periphery of the ring 56. The area to be engraved is illuminated from behind the tool 30. As will be apparent from FIG. 1, no portion of the fiber optic bundle 32 is visible when the apparatus is viewed in front elevation. The diameter of the fiber optic bundle 32 is slightly smaller than the diameter of the engraving tool 30. Thus, placement of the exposed end of the fiber optic bundle 32 directly behind the engraving tool 30 provides various advantages including elimination of shadows without interfering with the ability to view different areas of the inner periphery of the ring 56 by manipulation of the stylus arm, while at the same time directing light with little or no heat to an area which is difficult to illuminate. Another advantage of the illumination means described above is that it can be used without modification with an adaptor necessary for engraving large diameters bands such as bangle bracelets.

Figure 5:
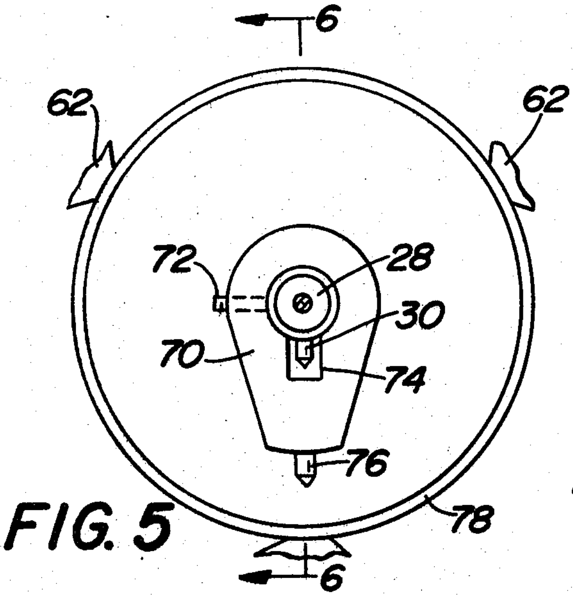
FIG. 5 is a front elevation view of another embodiment of the present invention which has been modified so as to permit engraving on the inner periphery of a large band or bracelet.
Figure 6:
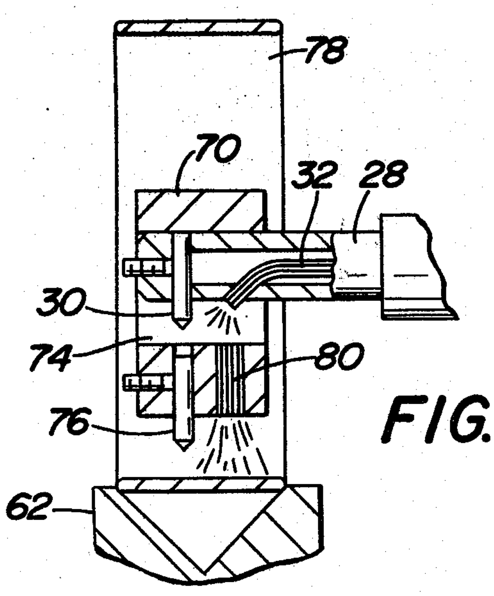
FIG. 6 is a sectional view taken along the line 6—6 in FIG. 5.

Referring to FIGS. 5 and 6, an engraving tool extension mount 70 is releasably attached to the tool holder 28 by way of set screws 72. The extension mount 70 has a large hole 74 into which extends the engraving tool 30. Thus, the extension mount 70 may be rapidly and easily attached without removing the normal cutting tool 30.

The extension mount 70 is provided with an engraving tool 76 for engraving on the inner periphery of the bangle bracelet 78. Bracelet 78 is held by the jaws 62 as described above. Immediately below the exposed ends of the fiber optic tube bundle 32, the extension mount 70 has an auxiliary fiber optic bundle 80 which is exposed at both ends. One end of bundle 80 is directly opposite the exposed end of bundle 32. The other end of bundle 80 is directed to illuminate the inner periphery of the bangle bracelet 78 adjacent to the engraving tool 76.

The apparatus of the present invention is utilized in a manner known to those skilled in the art and described in greater detail in the above-mentioned application and/or patent. In view of the above description with respect to illumination of the area to be engraved on the inner periphery of a circular object such as a ring or band, further description is not deemed necessary. In view of the disclosure herein, those skilled in the art will immediately recognize the unique advantages of the present invention whereby the area to be engraved is illuminated from behind the cutting tool without interfering with the ability of the engraver to verify the engraving and without casting shadows on the engraving area during the engraving process.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a frame supporting a tool holder, means on said frame for supporting a circular object to be engraved, said tool holder supporting an engraving tool for engraving on the inner periphery of a circular object such as a ring or band, the improvement comprising a fiber optic bundle supported by said tool holder and having one end exposed adjacent the engraving tool, said tool holder being hollow, at least a portion of said fiber optic bundle extending through the hollow interior of said tool holder, and a source of illumination communicating with the other end of said bundle.

2. An apparatus in accordance with claim 1 including means mounting said source of illumination for movement with said tool holder.

3. Apparatus in accordance with claim 1 including a lever movably supported at its upper end by said frame, a stylus connected to the lower end of said lever, said tool holder being connected to an intermediate portion of said lever, and said source of illumination being supported by said lever for movement therewith.

4. Apparatus comprising a frame supporting a tool holder, said tool holder supporting an engraving tool for engraving on the inner periphery of a circular object such as a ring or band, the improvement comprising a fiber optic bundle supported by said tool holder and having one end exposed adjacent the engraving tool, and a source of illumination communicating with the other end of said bundle, an extension mount secured to said tool holder, said engraving tool being connected to said extension mount, said extension mount having an auxiliary fiber optic bundle, one end of said auxiliary fiber optic bundle being illuminated by said one end of said first mentioned fiber optic bundle, and the other end of said auxiliary fiber optic bundle being exposed for illumination adjacent the engraving tool supported by said extension mount.

5. Engraving apparatus including a frame having a base, a pattern supported by said base, a stylus lever, a lower end of said lever having a stylus for tracing said pattern, the upper end of said lever being supported by said frame for movement in mutually perpendicular directions, an intermediate portion of said lever supporting a tool holder, said tool holder having an engraving tool for engraving on the inner periphery of a circular object, the improvement comprising a fiber optical means supported at least in part by said tool holder and having an exposed end adjacent said engraving tool for illuminating a portion of the inner periphery of a circular object adjacent the tip of the engraving tool, and a source of illumination communicating with the other end of said fiber optic means including an extension mount removably secured to said tool holder, said extension mount extending radially outwardly from said tool holder and supporting at its periphery an auxiliary engraving tool, said extension mount having an auxiliary fiber optic means having one free end exposed to illumination from said first-mentioned fiber optic means, and the other end of said auxiliary fiber optic means being exposed adjacent said auxiliary engraving tool.

6. Engraving apparatus including a frame having a base, a pattern supported by said base, a stylus lever, a lower end of said lever having a stylus for tracing said pattern, the upper end of said lever being supported by said frame for movement in mutually perpendicular directions, an intermediate portion of said lever supporting the tool holder, said tool holder having an engraving tool for engraving on the inner periphery of a circular object, means on said frame adjacent said engraving tool for supporting a circular object to be engraved, a fiber optic means supported at least in part by said tool holder and having an exposed end adjacent said engraving tool for illuminating a portion of the inner periphery of a circular object adjacent the tip of the engraving tool, said fiber optic means extending through at least a portion of said tool holder with said exposed end of the fiber optic means being located at a hole in said tool holder, said exposed end of the fiber optic means being directly behind the engraving tool, and a source of illumination communicating with the other end of said fiber optic means.

7. Apparatus in accordance with claim 6 wherein said source of illumination is supported by said stylus lever for movement therewith.

8. Apparatus in accordance with claim 6 wherein said exposed end of the fiber optic means is smaller in diameter than the diameter of said engraving tool.

9. Apparatus in accordance with claim 6 including means for reducing glare of light transmitted by said fiber optic means.

* * * * *